P. J. HIGGINS.
THREAD CUTTING TOOL.
APPLICATION FILED APR. 7, 1917.
1,293,432.
Patented Feb. 4, 1919.
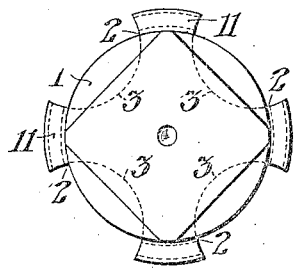
FIG. I.
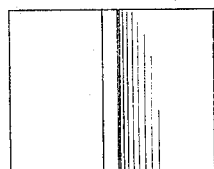
FIG. II.
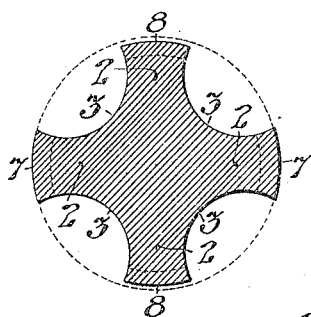
FIG. III.
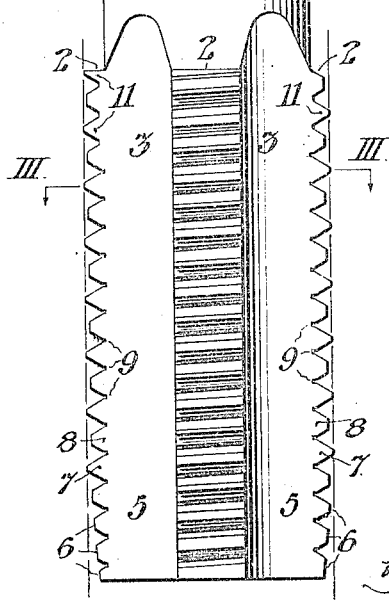
FIG. IV.
INVENTOR:
PHILIP J. HIGGINS,

UNITED STATES PATENT OFFICE.

PHILIP J. HIGGINS, OF PHILADELPHIA, PENNSYLVANIA.

THREAD-CUTTING TOOL.

1,293,432.   Specification of Letters Patent.   Patented Feb. 4, 1919.

Application filed April 7, 1917. Serial No. 160,546.

*To all whom it may concern:*

Be it known that I, PHILIP J. HIGGINS, a citizen of the United States, residing at Philadelphia, in the State of Pennsylvania, have invented a certain new and useful Improvement in Thread-Cutting Tools, whereof the following is a specification, reference being had to the accompanying drawing.

My invention is particularly adapted to be included in what is known as a screw threading tap. It is the usual practice to form such tools with circumferentially alternate lands and flutes, the lands being converged at their advance end so as to enter a drilled hole of less diameter than the thread which is to be formed, and to provide said lands with thread cutting sections of gradually increasing diameter on said converging portion and extending throughout the other portion of the lands of the precise configuration of the thread which it is desired to form. That is to say, said thread cutting sections are of the configuration of the thread to be formed, both at their radially outward and at their radially inward terminations. Although the flutes are designed to afford clearance spaces in which the chips produced by the thread cutting operations may accumulate and by which they may be discharged; in practice, it is found that chips of hard metal lodge at both radial extremes of the cutting surfaces and thus, frequently, produce threads which are of greater radial extent both at their largest diameter and at their smallest diameter than the standard desired. Therefore, it is the object of my invention to provide a tool which shall include circumferentially, *i. e.*, helically, cutting sections having clearance spaces throughout nearly its entire length but having its final cutting sections of the precise standard form; whereby threading operations may be conducted with greater rapidity and accuracy than with the ordinary tools above contemplated.

My invention includes the various novel features of construction and arrangement hereinafter more definitely specified.

In said drawing; Figure I is a rear end view of a screw threading tap conveniently embodying my invention.

Fig. II is a side elevation of said tap, showing the axially and helically alternate arrangement of the thread cutting sections.

Fig. III is a cross sectional view, taken on the line III, III in Fig. II, showing the circumferentially, *i. e.*, helically alternate arrangement of the thread cutting sections.

Fig. IV is a side elevation of a screw threading tool embodying my invention but adapted to cut a male thread.

In the form of my invention shown in Figs. I to III inclusive, the thread cutting tool comprises the cylindriform member 1 provided with the axially straight lands 2 and flutes 3; said lands 2 being converged at their outer surfaces toward the axis of said tool at the advance end, but being of the full diameter of the thread which is to be cut, at their other ends, each land being provided, at its converged portion 5, with leading thread sections 6, and presenting angular thread cutting sections 7 and 8 throughout the remainder of its length and having clearance grooves 9, for a limited portion of said length, at the roots of said sections 7 and 8, extending inwardly toward the axis of said tool to a greater extent than the thread which is to be cut. The thread cutting sections 8, which are alternate with respect to said thread cutting sections 7, both circumferentially, *i. e.*, helically, and axially on said lands 2, being of less radial extent than said thread cutting sections 7 thus afford clearance for the chips both at the radially outward and radially inward limit of the cutting surfaces of said sections 8. However, the rear end thread cutting sections 11 indicated in Figs. I and II, are of standard configuration and without said clearances.

The construction and arrangement above described is such that when the tool shown in Figs. I to III inclusive is screwed into a hole of the root diameter of said tool, the leading thread sections 6 begin the operation of forming a female thread in the wall of said hole of less diameter than the standard thread which is to be ultimately formed; the metal then extending into the clearance grooves 9. As said tool is turned, the succeeding action of said helically alternate thread cutting sections 7 and 8 forms the thread of standard configuration at its largest diameter but leaves it of less than its standard diameter until the rear end cutting sections 11 come into operation, when the thread is shaped to the standard internal diameter and to the complete standard configuration. During such operation, the clearances afforded by reason of the crests of the sections 8 being of less radial extent than the crests of the sections 7, to which they are helically alternate, facilitate the free and rapid discharge of the chips by way of the flutes 3 and permit the operation to be conducted with greater rapidity and facility than if the sections 7 and 8 were all of the same extent. In the use of an ordinary screw threading tap having the roots of the thread cutting sections of standard configuration, the threads cut are frequently marred at their radially inward crests, by chips which have failed to escape by way of the flutes, and, consequently, the marred thread is of larger diameter than it should be. This difficulty is obviated by the provision of the clearance grooves 9 which not only afford passageways for the discharge of chips but insure that more than sufficient metal to make the standard configuration of the thread desired, shall be left until the last stage of the threading operation. In practice I have found it preferable to make said clearance grooves .003 of an inch wider than the crests of the screw threads to be formed by the tap.

In the form of my invention shown in Fig. IV, the tool 14 may be a flat plate such as may be detachably included in a die stock or other thread chasing device, to form therein a land having, at its inclined end 15, leading thread sections 16, and presenting angular thread cutting sections 17 and 18 throughout the remainder of its length and having clearance grooves 19 for a limited portion of said length, at the roots of said sections, extending inwardly with respect to said tool 14 to a greater extent than the thread which is to be cut; said thread cutting sections 18 which are alternate with respect to said thread cutting sections 17, axially on said tool 14, being of less radial extent than said thread cutting sections 17 and thus affording clearance for the chips both at the radially outward and radially inward limit of the cutting surfaces of said sections 17 and 18. However, the rear end thread cutting sections 21 indicated in Fig. IV, are of standard configuration and without said clearances.

The construction and arrangement above described is such that when the tool shown in Fig. IV is caused to relatively axially traverse a cylindrical bar with its inclined end 15 in advance, it operates to form a male thread in substantially the manner described with reference to the other tool aforesaid.

I do not desire to limit myself to the precise details of construction and arrangement herein set forth as it is obvious that various modifications may be made therein without departing from the essential features of my invention as defined in the appended claims.

I claim:—

1. A thread cutting tool having a body, and a plurality of thread cutting teeth formed on the body and defining a spiral encircling the body, those teeth in each alternate convolution of the spiral corresponding in cross-sectional outline to the cross-sectional outline of the thread to be cut, those teeth in the intervening convolutions similarly corresponding to the thread to be cut with the exception of having their crests removed to leave flat tops parallel with the axis of the body, whereby the said latter teeth perform the initial cutting of the thread and the said former teeth the finishing and bottoming thereof.

2. A thread cutting tool comprising a fluted body formed with lands between the flutes, and a plurality of thread cutting teeth formed transversely across the lands from flute to flute, the alternate teeth on each land corresponding in cross-sectional outline to the cross-sectional outline of the thread to be cut and the intervening teeth thereon similarly corresponding to the thread to be cut with the exception of having their crests removed to leave flat tops parallel with the axis of the body, the full teeth on adjacent lands being in spiral alinement and the flat teeth being similarly alined, whereby the said latter teeth perform the initial cutting of the thread and the said former teeth the finishing and bottoming thereof, the flat teeth the while providing clearance spaces for conducting to the flutes the chips removed by the full teeth in the bottoming operation.

In testimony whereof, I have hereunto signed my name at Philadelphia, Pennsylvania, this twentieth day of March, 1917.

PHILIP J. HIGGINS.

Witnesses:
ARTHUR E. PAIGE,
ANNA ISRAELVITZ.